United States Patent [19]

Kuretake et al.

[11] Patent Number: 5,437,472
[45] Date of Patent: Aug. 1, 1995

[54] INFLATOR AND AIR BAG DEVICE FOR DRIVER

[75] Inventors: Masato Kuretake; Takayasu Zushi; Motonobu Kitagawa; Kazuhiko Yamakawa; Yoshimi Okamoto; Sawayo Uda, all of Shiga, Japan

[73] Assignee: Takata Corporation, Tokyo, Japan

[21] Appl. No.: 166,814

[22] Filed: Dec. 15, 1993

[30] Foreign Application Priority Data

Jan. 6, 1993 [JP] Japan .................. 5-000573

[51] Int. Cl.⁶ .............................. B60R 21/26
[52] U.S. Cl. .................... 280/737; 280/740; 280/742; 222/3
[58] Field of Search .............. 280/737, 741, 728 R, 280/740, 742; 422/164, 166; 222/3

[56] References Cited

U.S. PATENT DOCUMENTS

| | | | |
|---|---|---|---|
| 3,797,853 | 3/1974 | Grosch | 280/740 |
| 3,891,233 | 6/1975 | Damon | 280/741 |
| 3,960,390 | 6/1976 | Goetz | 280/731 |
| 3,984,126 | 10/1976 | Goetz et al. | 280/741 |
| 3,986,456 | 10/1976 | Doin et al. | 280/741 |
| 4,013,305 | 3/1977 | Ichihara | 280/740 |
| 4,066,415 | 1/1978 | Kasama et al. | 422/165 |
| 5,221,109 | 6/1993 | Marchant | 280/741 |
| 5,301,978 | 4/1994 | Münzel et al. | 280/737 |

FOREIGN PATENT DOCUMENTS

| | | | |
|---|---|---|---|
| 2443267 | 3/1975 | Germany | 280/741 |
| 2274089 | 7/1994 | United Kingdom | 280/736 |

*Primary Examiner*—Karin L. Tyson
*Attorney, Agent, or Firm*—Kanesaka & Takeuchi

[57] ABSTRACT

An inflator is formed of a container packed with gas generating agents, a device for initiating the gas generating reaction of the gas generating agents, injection holes provided in one surface of the container so as to inject the gas generated in the container to the outside therethrough, a plate provided on the one surface of the container in such a manner as to cover the injection holes, and a connecting device for connecting the plate and the container. The connecting device allows the plate to move away from the one surface of the container by a predetermined distance.

9 Claims, 7 Drawing Sheets

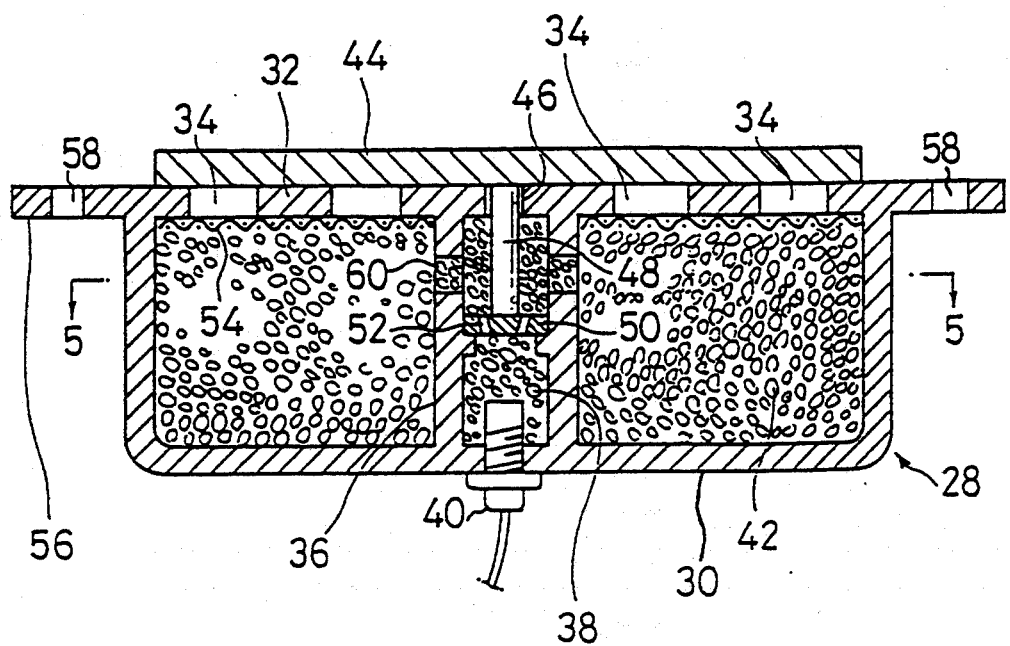
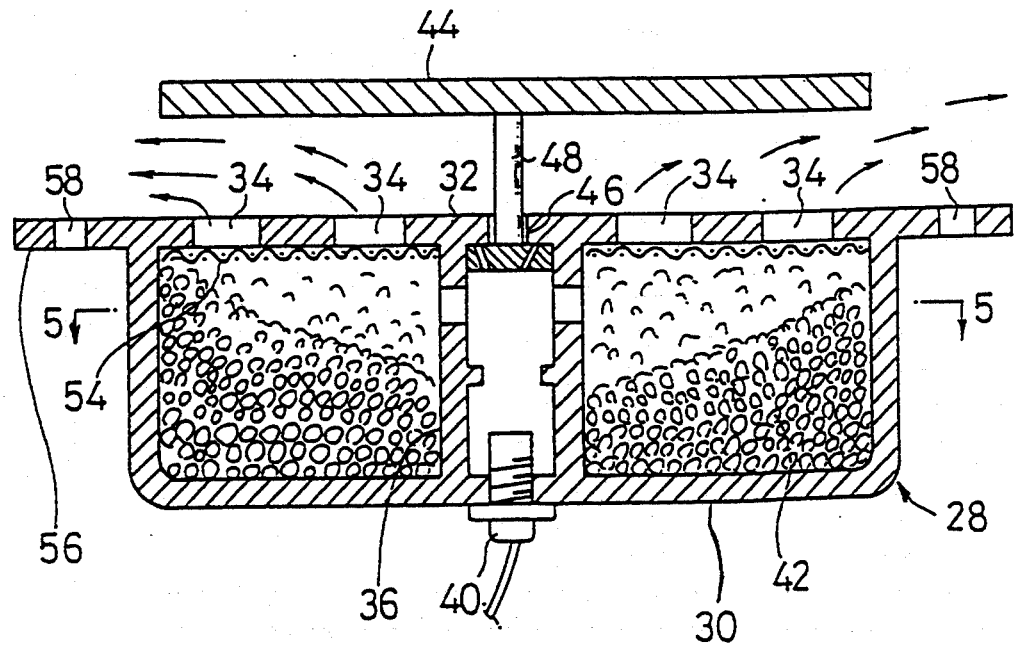
FIG. 4

INFLATOR AND AIR BAG DEVICE FOR DRIVER

BACKGROUND OF THE INVENTION

1. Field of the Invention

The present invention relates to an inflator of an air bag device for vehicles, and an air bag device for a driver incorporating the inflator. More particularly, the present invention relates to an inflator provided with a mechanism for controlling the direction of ejection of gas, and an air bag device for a driver incorporating the inflator.

2. Description of the Related Art

An air bag device for vehicles is a device for protecting an occupant by extending an air bag when a vehicle comes into collision. The air bag device is provided with an inflator for generating and ejecting gas so as to extend the air bag.

FIG. 2 is a vertical sectional view of a conventional air bag device for a driver. A retainer 10 in the shape of a plate is provided with an inflator insertion hole 12 for receiving an inflator 14 at the center thereof.

A gas receiving hole 18 of an air bag 16 is disposed concentrically with the hole 12, and a flange 14a of the inflator 14 and the peripheral portion of the gas receiving hole 18 are fixed to the retainer 10 by fitting members such as bolts, rivets and split pins.

The air bag 16 is folded in such a manner as to be extended by the gas ejected from the inflator 14. The air bag 16 is covered with a module cover 22 which is fixed to the retainer 10. When the gas from the inflator 14 is ejected from ejection holes 24, the air bag 16 begins to be extended. The module cover 22 is then torn along a tear line 26, whereby the air bag 16 is largely extended toward the driver.

In an air bag device for a driver, it is favorable for a driver that the air bag 16 quickly and largely extends vertically and horizontally (rightward and leftward in FIG. 2). For this purpose, in a conventional air bag device for a driver, the inflator 14 is projected from the retainer 10 toward the inside of the air bag device, and the ejection holes 24 are provided in the peripheral surface of the inflator 14. When gas is ejected sideways through the ejection holes 24, the air bag 16 quickly and largely extends rightward and leftward in FIG. 2.

In the conventional air bag device for a driver, however, since the inflator 14 projects toward the inside of the air bag device, the thickness $T_2$ of the air bag device at the portion above the retainer 10 increases by the height of the projected portion of the inflator 14.

OBJECT AND SUMMARY OF THE INVENTION

Accordingly, it is an object of the present invention to provide an inflator for an air bag device which can reduce the thickness of an air bag device, and an air bag device for a driver incorporating such an inflator.

It is another object of the present invention which facilitates the tearing of the module cover along the tear line.

To achieve this aim, in a first aspect of the present invention, there is provided an inflator comprising: a container packed with gas generating agents; a means for initiating the gas generating reaction of the gas generating agents; ejection holes provided in one surface of the container so as to eject the gas generated in the container to the outside therethrough; a plate provided on the one surface of the container in which the ejection holes are provided in such a manner as to cover the ejection holes; and a connecting mechanism for connecting the plate and the container in such a manner as to allow the plate to move away from the one surface of the container by a predetermined distance.

An inflator provided in a second aspect of the present invention is that wherein the container is in the shape of a cylinder with one end surface provided with the ejection holes and a flange extending in the radial direction of the container.

An inflator provided in a third aspect of the present invention is that the connecting mechanism is composed of a leg member erected on the under surface of the plate and inserted into the container perpendicularly to the plate surface, and a claw portion provided at the end of the leg member.

An inflator provided in a fourth aspect of the present invention is that the connecting mechanism is composed of a leg member erected on the under surface of the plate perpendicularly to the plate surface and penetrated through the flange, and a claw portion provided at the end of the leg member.

In a fifth aspect of the present invention, there is provided an air bag device for a driver comprising: a retainer in the shape of a plate provided with an inflator insertion hole at the center thereof; an inflator provided in any of the first to fourth aspects of the present invention and inserted into the inflator insertion hole; an air bag attached to the inflator and folded in such a manner as to be extended by the gas ejected from the inflator; and a module cover having a tear line along which the module cover is opened.

In an inflator of the present invention, when the gas generating agents start the gas generating reaction, the gas is about to jet out of the ejection holes. The gas pressure pushes the plate off the container. When the plate is pushed up, a gap is produced between the plate and the container, and the gas is ejected sideways through the gap.

It is possible to attach the inflator provided in the second aspect of the present invention to the retainer by utilizing the flange in such a manner as to prevent the inflator from projecting toward the inside of the air bag device.

In the inflator provided in the third aspect of the present invention, when the plate is pushed up by a predetermined distance, the claw portion is caught by the inner surface of the container, thereby checking a further movement.

In the inflator provided in the fourth aspect of the present invention, when the plate is pushed up by a predetermined distance, the claw portion is caught by the back surface of the flange, thereby checking a further movement.

In the air bag device provided in the fifth aspect of the present invention, the inflator is provided in such a manner as to hardly project toward the inside of the air bag device, thereby making the thickness of the air bag device small. Furthermore, when the plate is pushed up, the module cover is pressed from the back side thereof, and a rip is developed along the tear line. Therefore, when the air bag is extended, the module cover is quickly torn to open.

The above and other objects, features and advantages of the present invention will become clear from the following description of the preferred embodiments thereof, taken in conjunction with the accompanying drawings.

BRIEF DESCRIPTION OF THE DRAWINGS

FIG. 3 is a vertical sectional view of an embodiment of an inflator according to the present invention;

FIG. 4 is an explanatory view of the operation of the embodiment shown in FIG. 3;

DESCRIPTION OF THE PREFERRED EMBODIMENTS

Figure 5:
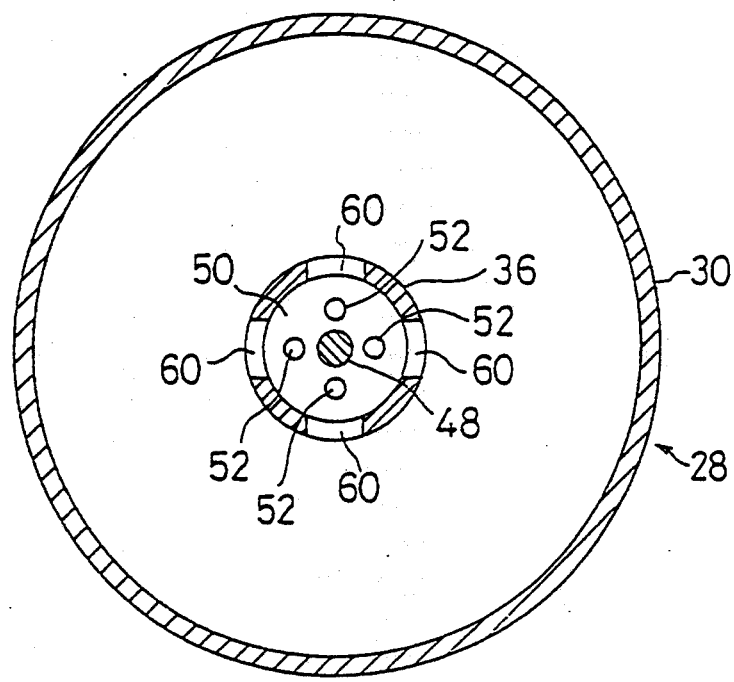
FIG. 5 is a sectional view of the embodiment shown in FIG. 3, taken along the line 5—5.

A first embodiment of the present invention will be explained with reference to FIGS. 1, 3, 4 and 5. In FIG. 5, gas generating agents are omitted.

In FIG. 3, a short cylindrical container 30 is provided with a multiplicity of ejection holes 34 in the upper surface 32 thereof. A cylinder portion 36 is provided at the central portion of the container 30, and the lower part of the cylinder portion 36 is packed with ignition agents 38. An ignitor 40 for igniting the ignition agents 38 is attached to the container 30. The other part of the container 30 outside of the cylinder portion 36 is packed with gas generating agents 42.

A plate 44 is placed on the upper surface 32 of the container 30 so as to cover the ejection holes 34. A shaft 48 as a leg member is erected at the center of the under surface of the plate 44 and inserted into the cylinder portion 36 through an opening 46 provided in the upper surface 32 of the container 30. A claw 50 in the shape of a disc is provided at the end of the shaft 48. Openings 52 through which the upper part and the lower part of the cylinder portion 36 communicate with each other are formed in the claw 50. The upper part of the cylinder portion 36, which is above the claw 50, is packed with the gas generating agents 42.

A mesh 54 is disposed in the container 30 in such a manner as to face the ejection holes 34 so as to remove the particulates from the gas which is ejected through the ejection holes 34. A flange 56 is provided at the upper end of the container 30 in such a manner as to project in the radial direction of the container 30. Bolt holes 58 are formed in the flange 56.

In the inflator 28 having the above-described structure, when the ignition agents 38 are ignited by the ignitor 40, the high-temperature gas generated from the ignition agents 38 is carried to the gas generating agents 42 in the cylinder portion 36, which starts gas generating reaction. The high-temperature gas is also carried to the gas generating agents 42 outside of the cylinder portion 36 through large openings 60, and a larger amount of gas is rapidly generated. The gas pressure through the injection holes 34 pushes the plate 44 upward until the claw 50 comes into contact with the back side of the upper surface 32, as shown in FIG. 4. The gas is ejected sideways through the gap between the plate 44 and the upper surface 32.

Figure 1:
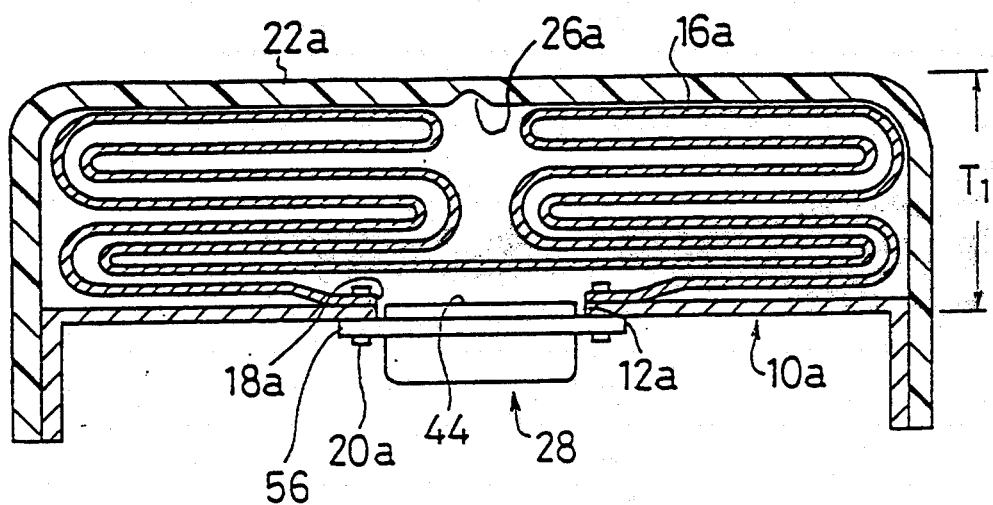
FIG. 1 is a vertical sectional view of an embodiment of an air bag device for a driver according to the present invention.
Figure 2:
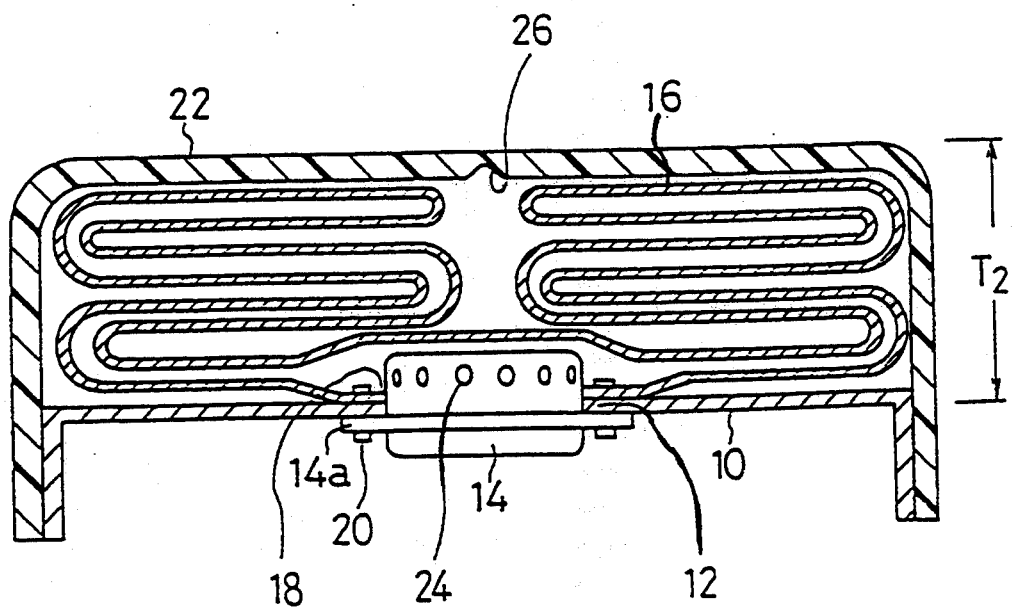
FIG. 2 is a vertical sectional view of a conventional air bag device for a driver.

As shown in FIG. 1, the flange 56 of the inflator 28 is fixed together with the peripheral portion of the gas receiving opening of the air bag 16a to the peripheral portion of an inflator insertion hole 12a of a retainer 10a by fitting members 20a. As is clear from FIG. 1, the inflator 28 hardly projects toward the inside of the air bag device; that is, only the plate 44 is disposed within the air bag device in such a manner as to face the inflator insertion hole 12a. It is therefore possible to make the thickness $T_1$ of the air bag device at the part above the retainer 10a smaller than the thickness $T_2$ of the conventional air bag device at the same part shown in FIG. 2.

When the plate 44 is elevated, as shown in FIG. 4, an air bag 16a is pushed upward and a module cover 22a is also pushed upward from the back side thereof to the upper area in FIG. 1. As a result, a rip is developed along the tear line 26a. When the air bag 16a is extended the module cover 22a is opened very quickly.

Figure 6:
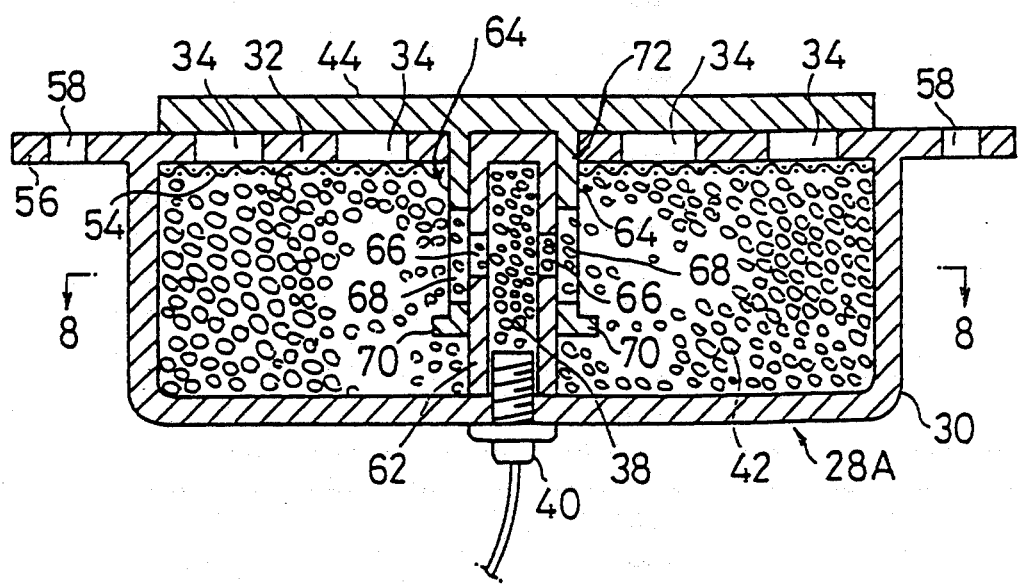
FIG. 6 is a vertical sectional view of another embodiment of an inflator according to the present invention.
Figure 7:
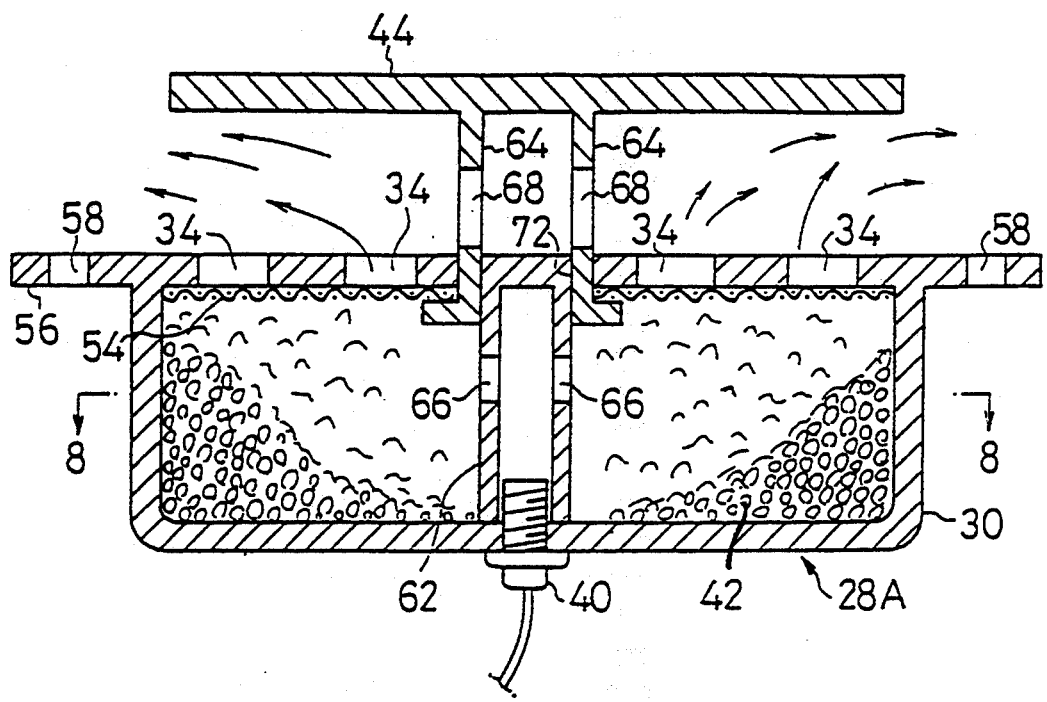
FIG. 7 is an explanatory view of the operation of the embodiment shown in FIG. 6.
Figure 8:
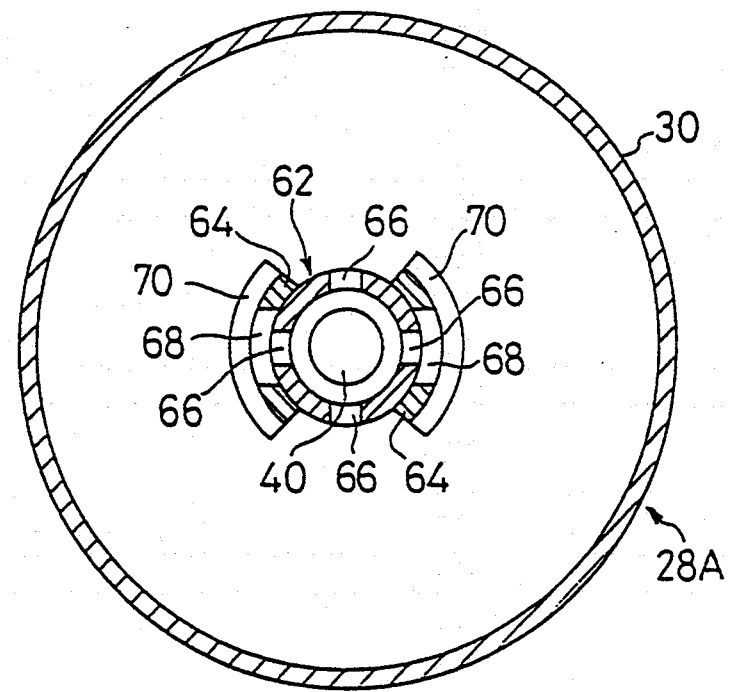
FIG. 8 is a sectional view of the embodiment shown in FIG. 6, taken along the line 8—8.

FIG. 6 is a vertical sectional view of another embodiment of an inflator according to the present invention, FIG. 7 is an explanatory view of the operation thereof, and FIG. 8 is a sectional view, taken along the line 8—8 in FIG. 6. In FIG. 8, the graph of the gas generating agents is omitted.

In an inflater 28A of this embodiment, a cylinder portion 62 having a smaller diameter than that shown in FIG. 3 is provided at the central portion of the container 30. A cylindrical leg 64 is erected at the center of the plate 44 and extended outside of the cylinder portion 62. Openings 66 and 68 are provided in the cylinder portion 62 and the leg 64, respectively. A claw 70 is provided at the end of the leg 64. The reference numeral 72 represents an opening provided in the upper surface 32 of the container 30 so as to insert the leg 64 into the container 30 therethrough.

The other structure of the inflator 28A is the same as the structure of the inflator 28. The same numerals are provided for the elements which are the same as those of the inflator 28, and explanation thereof will be omitted.

In the inflator 28A having the above-described structure, when the ignition agents 38 are ignited by the ignitor 40, the gas generating agents 42 start the gas generating reaction. The gas carried through the ejected holes 34 pushes the plate 44 upward. The gas is injected sideways through the gap between the plate 44 and the upper surface 32, as shown in FIG. 7.

Figure 9:
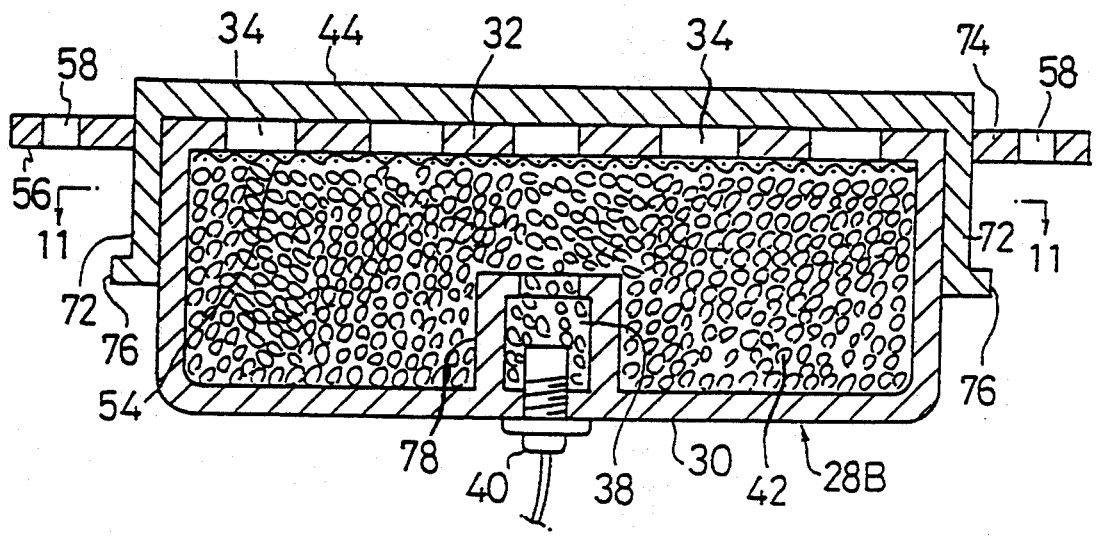
FIG. 9 is a vertical sectional view of still another embodiment of an inflator according to the present invention.
Figure 10:
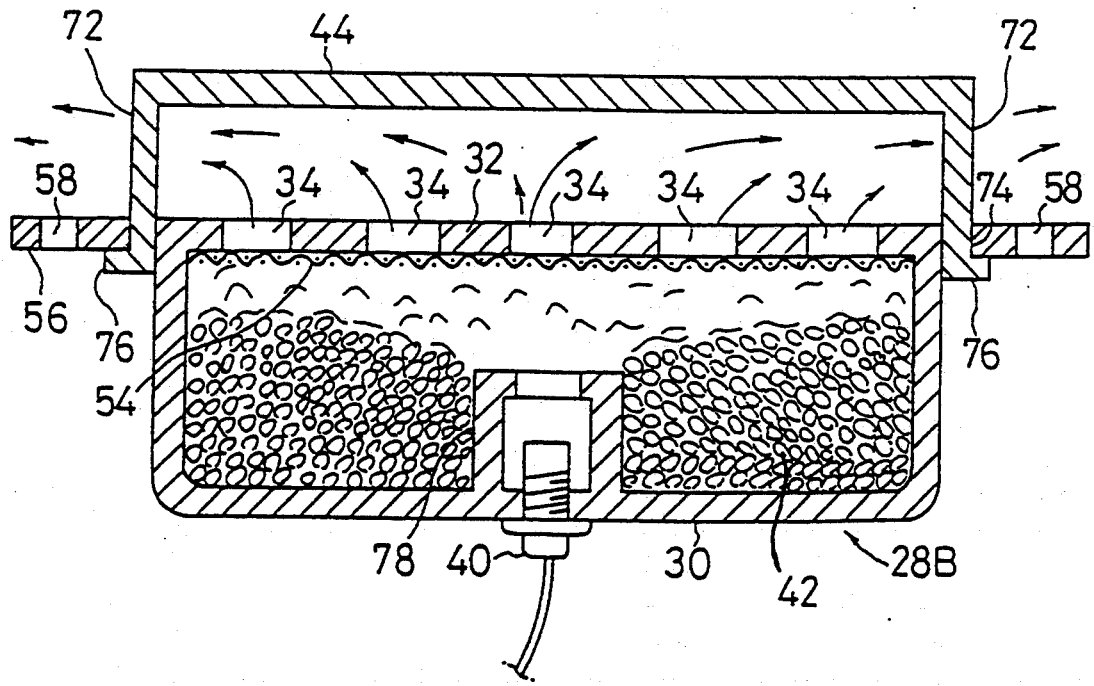
FIG. 10 is an explanatory view of the operation of the embodiment shown in FIG. 9.
Figure 11:
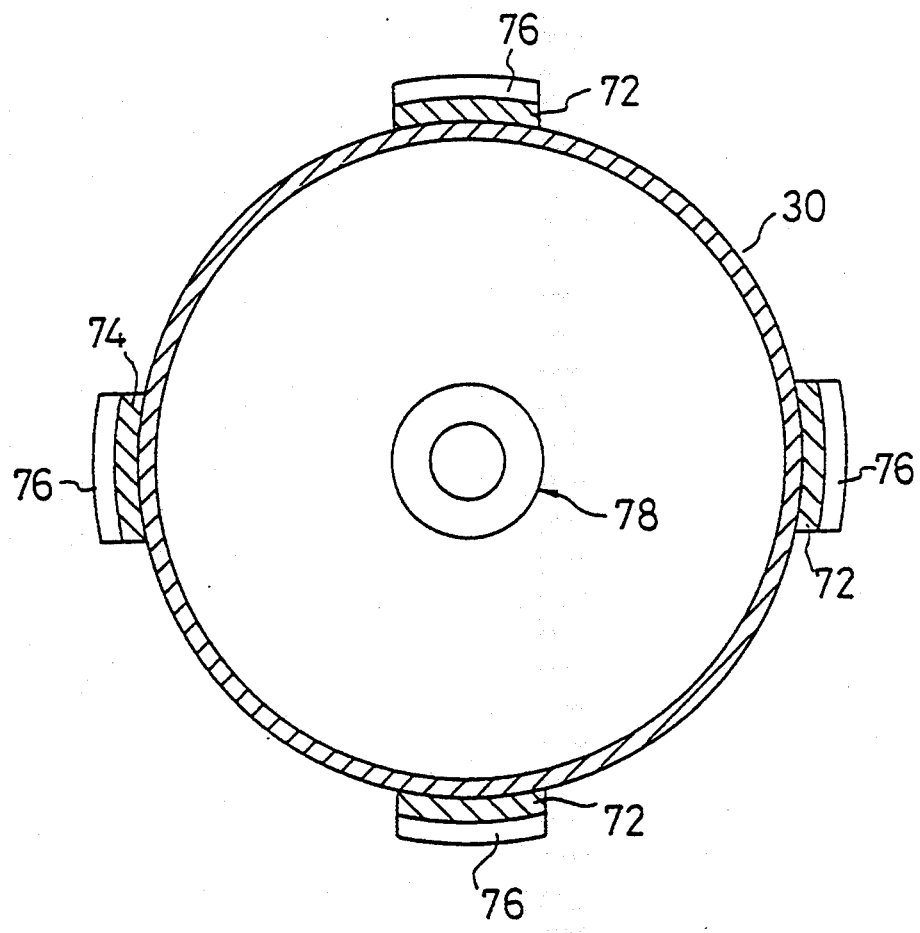
FIG. 11 is a sectional view of the embodiment shown in FIG. 9, taken along the line 11–11.

FIG. 9 is a vertical sectional view of still another embodiment of an inflator 28B according to the present invention, FIG. 10 is an explanatory view of the operation thereof, and FIG. 11 is a sectional view thereof, taken along the line 11—11 in FIG. 9. In FIG. 11, gas generating agents are omitted.

In an inflater 28B of this embodiment, legs 72 are extended from the outer peripheral portion of the plate 44 to the outer peripheral surface of the container 30 through openings 74 provided in the flange 56. A claw 76 is provided at the end of each leg 72. A short cylinder portion 78 is provided upward from the bottom portion of the container 30, and the cylinder portion 78 is packed with the ignition agents 38.

In the inflator 28B, when the ignition agents 38 are ignited by the ignitor 40, the gas generating agents 42 start the gas generating reaction. The gas injection pressure pushes the plate 44 upward, as shown in FIG. 10. The gas is then ejected sideways through the gap between the plate 44 and the upper surface 32.

Figure 12:
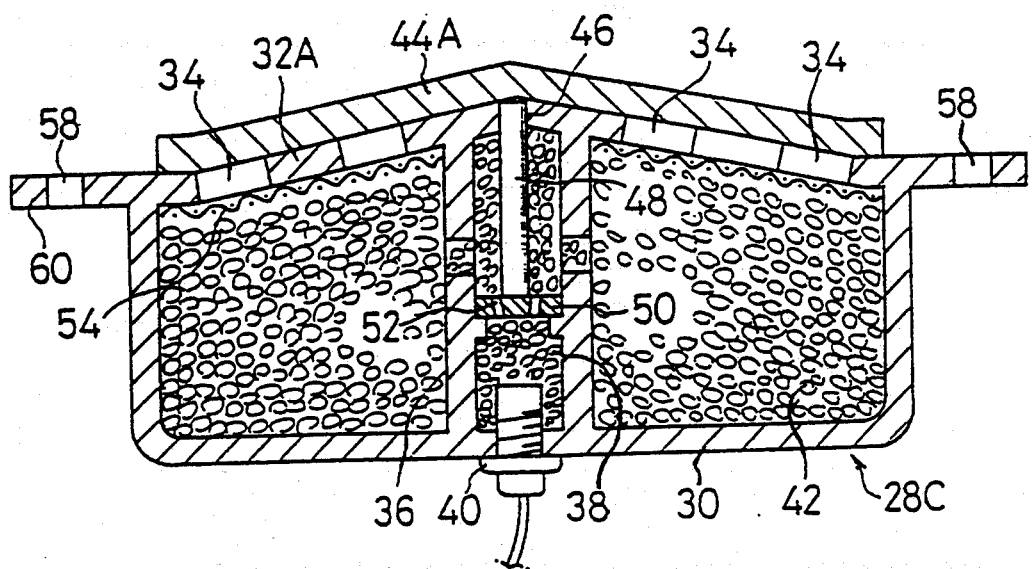
FIG. 12 is a vertical sectional view of a further embodiment of an inflator according to the present invention.
Figure 13:
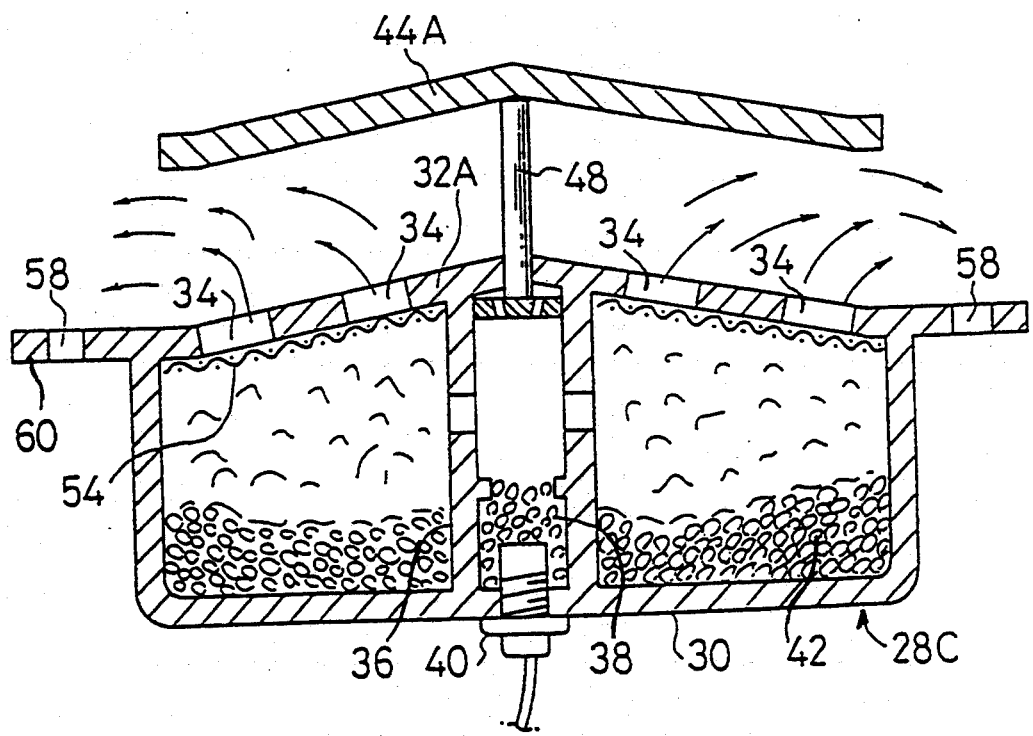
FIG. 13 is an explanatory view of the operation of the embodiment shown in FIG. 12.

In any of these embodiments, both the upper surface 32 and the plate 44 are planar, but they may have a shape of a cone, as represented by the reference numerals 32A and 44A in FIGS. 12 and 13. If the plate 44A in the shape of a cone is used, when the plate 44A is pushed upward, the pressing force of the plate 44A is concentratedly applied to the tear line 26a of the module cover 22a. The module cover 22a therefore is easy to open at the center portion of the air bag device. In addition, the gas is ejected horizontally downwardly (in FIG. 13) rather than simply horizontally, so that the air bag 16a is easy to open sideways.

These embodiments are only examples of the present invention, and the upper surface and the plate may have another shape. It goes without saying that the container and the cylinder portion may have a shape other than those shown in the embodiments. In addition, although the inflator is attached to the retainer by bolts, rivets or the like in these embodiments, it may be screwed into the retainer.

As described above, according to the present invention, the gas is ejected sideways seen from the inflator. Since the inflator is attached to the retainer without approximately any projection toward the inside of the air bag device, it is possible to make the thickness of the air bag device small. In addition, the elevated plate of the inflator accelerates the tearing operation of the module cover.

An air bag device for a driver according to the present invention has a small thickness and enables the module cover to be quickly torn.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An air bag device for a driver, comprising:
   a retainer having a plain outer surface, and an inflator insertion hole therein,
   an air bag attached to and placed on the retainer,
   a module cover placed over the retainer to cover the air bag and having a tear line so that the module cover is torn along the tear line, and
   an inflator inserted into the inflator insertion hole and fixed to the retainer, said inflator including,
   a container having a lower portion, and an upper portion fixed to the lower portion and having a plurality of ejection holes therein,
   gas generating agents retained in the container, said gas generating agents, when operated, generating gas which is ejected through the ejecting holes,
   a plate situated on the container for substantially covering the entire upper portion of the container and being movable in a direction away from the container, said plate having an outer surface with a cone shape projecting toward the module cover and disposed under the tear line so that when the gas is generated by the gas generating agents, the plate is pushed in the direction away from the container by the gas ejected through the ejection holes and an upward pressing force of the plate is concentrated to the tear line to easily tear the module cover, the gas ejected through the ejection holes being deflected by the plate and oriented substantially horizontally downwardly to help opening of the air bag sidewardly, and
   connecting means installed between the plate and the container, said connecting means allowing the plate to move from the container for a distance such that the module cover is torn by the plate.

2. An air bag device according to claim 1, wherein said plate includes an inner surface having a cone shape as in the outer surface to reflect the gas ejected through the ejection holes horizontally downwardly.

3. An air bag device according to claim 2, wherein said upper portion of the container has a cone shape as in the plate, said ejection holes formed in the upper portion being oriented perpendicular to the inner surface of the plate.

4. An air bag device according to claim 3, wherein said container is fixed to the retainer such that the outer surface of the plate is located generally horizontally to flush with an outer surface of the retainer.

5. An air bag device according to claim 4, wherein said connecting means includes at least one leg member fixed at one end to the plate and a claw portion fixed to the other end of the leg member, said leg member passing through the upper portion of the container and the claw portion preventing upward movement of the plate by engaging the plate when the plate is moved upwardly.

6. An air bag device according to claim 5, wherein said container includes a cylindrical portion at a center thereof, and means for igniting the gas generating agents, said igniting means being disposed in the cylindrical portion.

7. An air bag device according to claim 6, wherein said claw portion is located in the cylindrical portion.

8. An air bag device according to claim 6, wherein a plurality of leg members is disposed to surround the cylindrical portion.

9. An air bag device according to claim 5, wherein a plurality of leg members is fixed to an outer periphery of the plate at a predetermined distance away from each other.

* * * * *